Oct. 11, 1949.　　　M. R. HUTCHISON, JR　　　2,484,510
CAMERA CONSTRUCTION

Filed March 15, 1945　　　3 Sheets-Sheet 1

MILLER R. HUTCHISON, JR
INVENTOR

BY
ATTORNEYS

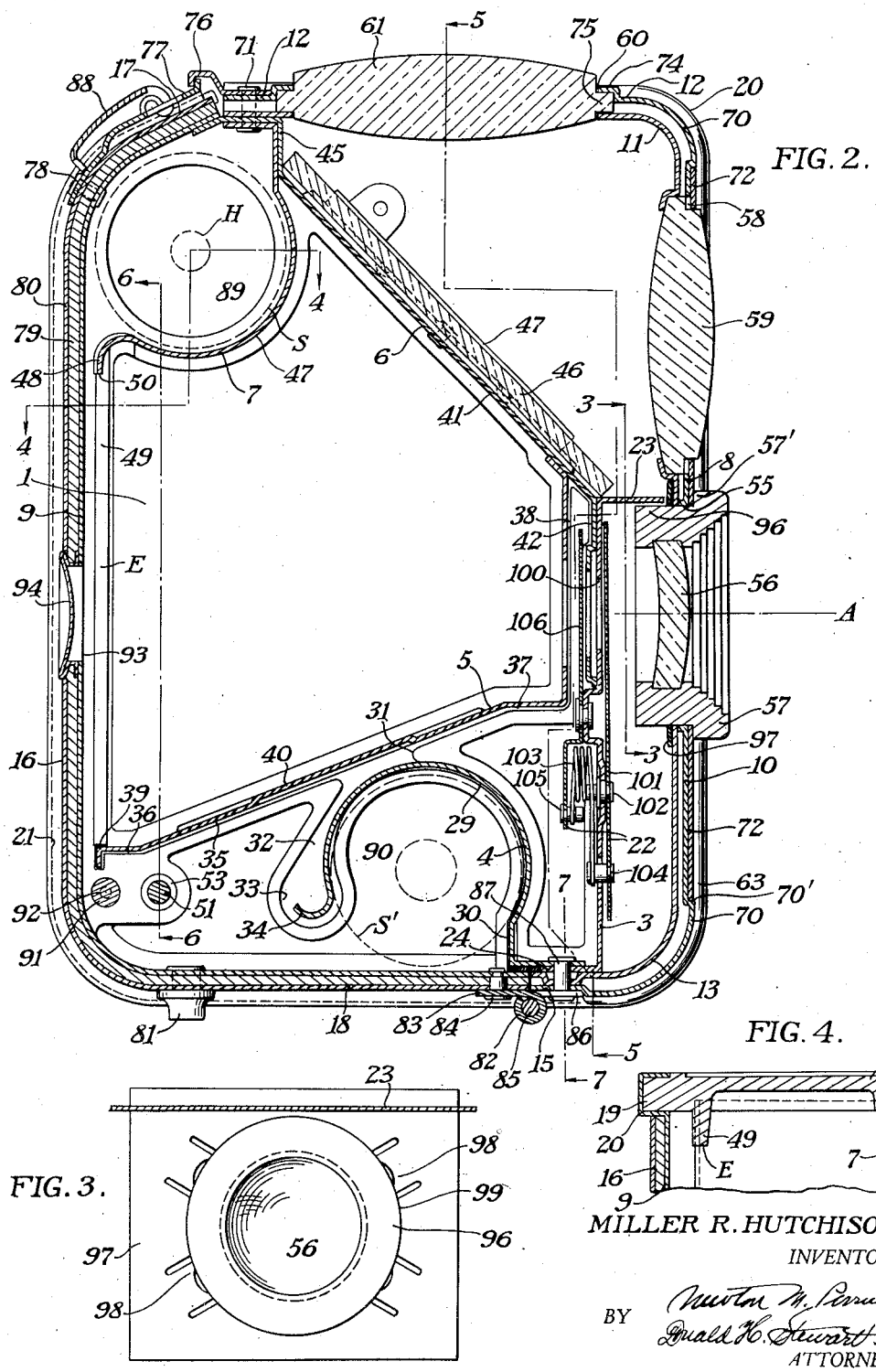

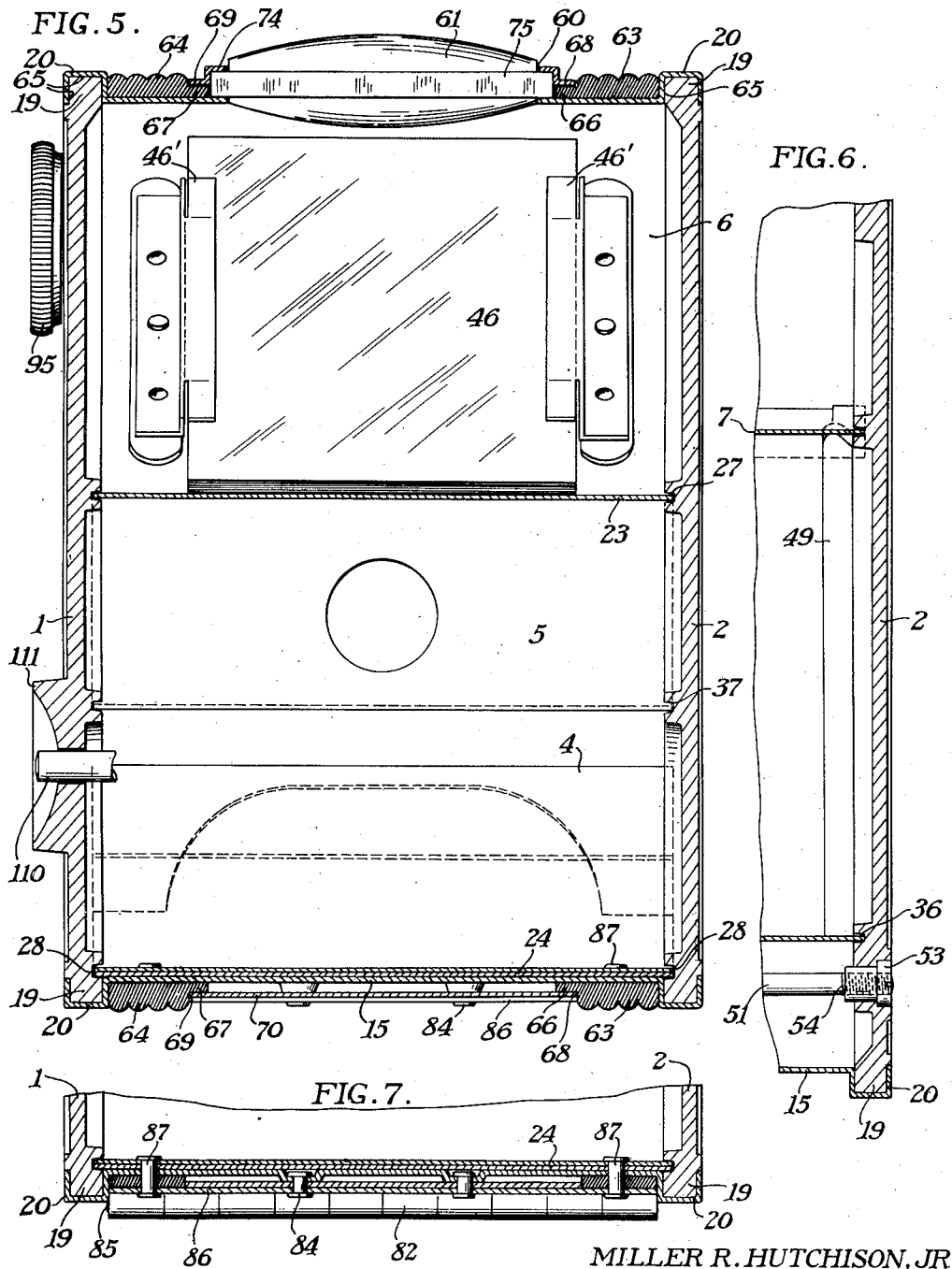

Patented Oct. 11, 1949

2,484,510

UNITED STATES PATENT OFFICE 2,484,510

CAMERA CONSTRUCTION

Miller R. Hutchison, Jr., Rochester, N. Y., assignor to Eastman Kodak Company, Rochester, N. Y., a corporation of New Jersey Application March 15, 1945, Serial No. 582,847

14 Claims. (Cl. 95—31)

This invention relates to photography and more particularly to camera construction. One object of my invention is to provide a camera particularly designed to facilitate assembly. Another object of my invention is to provide a camera which may consist of a large number of parts so arranged that sub-assemblies and a complete assembly can readily be made and so arranged that a minimum number of fastening members are required to hold the parts together. Another object of my invention is to provide a camera body in which parallel walls are arranged to hold most of the assembled parts between them by the opposite edges of these parts and to provide a simple means for holding the main supporting walls in assembled relationship. Another object of my invention is to provide a camera of the reflex type in which the parts are simple and may be readily assembled. Other objects will appear from the following specification, the novel features being particularly pointed out in the claims at the end thereof.

In the past one of the difficulties of providing camera sections with grooves adapted to support other camera parts has been that such construction usually required a relatively high degree of accuracy in the parts to be held in assembled relationship by the tongues and grooves. In such cameras it has usually been the practice to provide tongues and grooves which fit quite accurately and the grooved holding parts are usually held together directly so that if by any chance the width of the members having tongues fitting into the grooves should differ one from another, the two grooved walls holding such parts could not be satisfactorily fastened together without varying their spacing and without tending to rock on certain of the parts which were longer than other parts, thus making assembly difficult, and also frequently causing some of the parts to be distorted by the binding action of the grooved supporting plates.

One of the objects of my present invention is to provide a construction which enables a series of different parts to be supported solely by a pair of main supporting parallel plates, but which also is so arranged that considerable variations in width of the parts to be held by the two main supporting plates can exist without effecting the camera after complete assembly. In other words, I provide a pair of main supporting plates with grooves which are of somewhat greater depth than would normally be considered necessary for supporting the partition plates, and I provide a means for accurately positioning the grooved plates in such a manner that a small amount of lost motion between the partition plates and the supporting plates can take place without in any way affecting the construction of the camera. In addition, I have arranged the camera walls in such a manner that sub-assemblies can be made before a complete assembly is made, thus reducing the labor necessary in constructing the camera.

Coming now to the drawings wherein like reference characters denote like parts throughout:

Fig. 2 is an enlarged sectional view taken through a camera illustrating a preferred embodiment of my invention;

Fig. 3 is a view taken on line 3—3 of Fig. 2 illustrating the means for holding the camera objective in place;

Fig. 4 is a section taken on line 4—4 showing a portion of the construction of the camera wall;

Fig. 5 is a section taken on line 5—5 of Fig. 2;

Fig. 6 is a fragmentary section taken on line 6—6 of Fig. 2; and

Fig. 7 is a fragmentary detail section taken on line 7—7 of Fig. 2.

Figure 1:
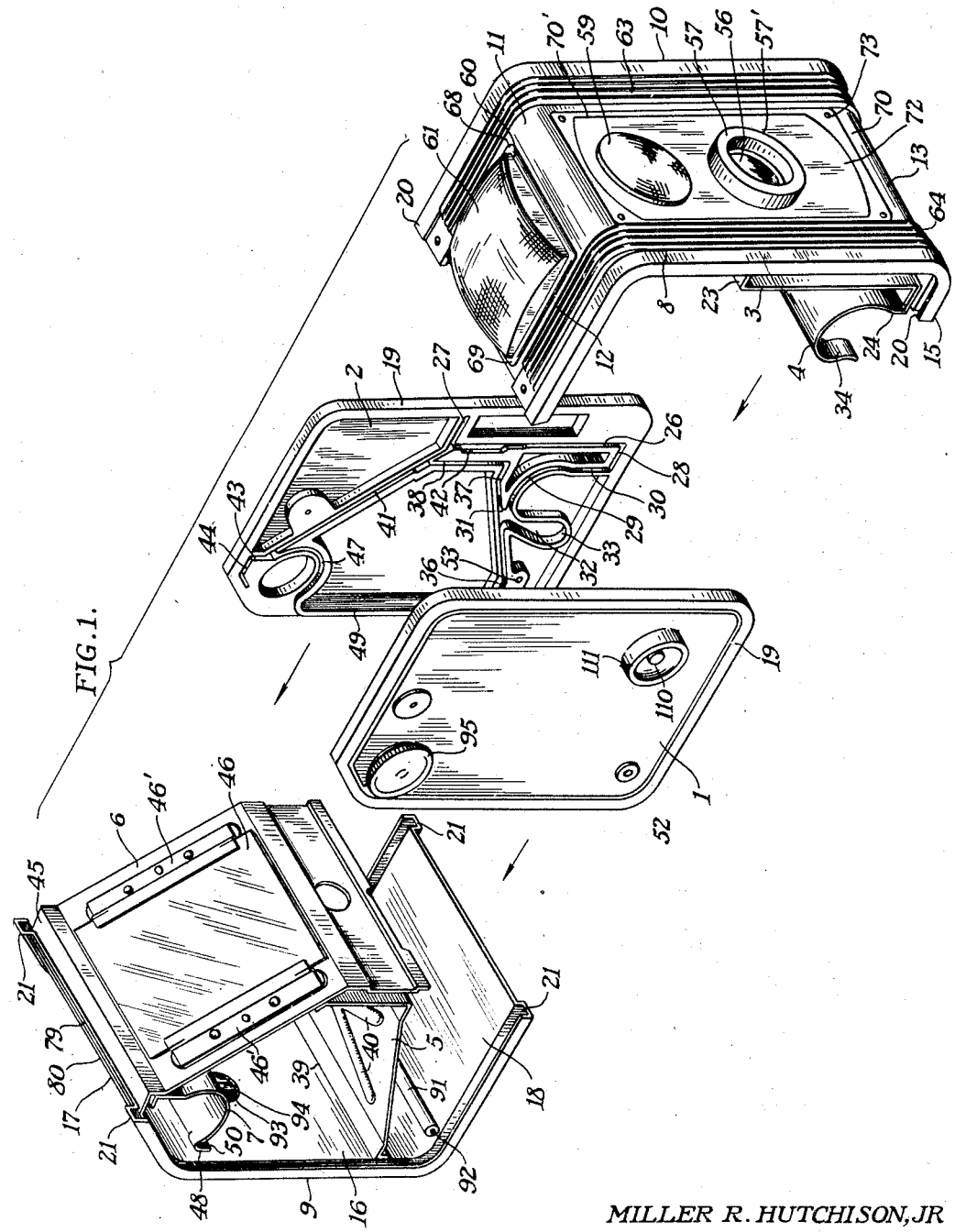
Fig. 1 is an exploded perspective view of a camera showing some of the main parts before assembly and illustrating somewhat diagrammatically the construction of a preferred form of camera.

My camera body may be said to broadly consist of a pair of parallel main supporting walls, these walls supporting most of the partition plates inside of the camera and being definitely held in spaced relationship by outer camera walls preferably made in two parts which will form the four walls extending between the two main supporting walls.

More specifically, a preferred form of my camera as illustrated in Fig. 1 may consist of a pair of spaced side plates 1 and 2 forming the main supporting members, these plates including a series of grooves which will be hereinafter more fully described for supporting the following partition plates: A shutter plate 3, a lower roll holder plate 4, a lower partition plate 5, a mirror-holding partition plate 6, and an upper roll holding plate 7. Each of these plates is supported by its extreme edge entering the slots which will be described later. In addition, the camera comprises two outer body plates designated generally as 8 and 9, these two plates being generally U-shaped in cross section. Plate 8 forms a front wall 10 and is bent at 11 to form a portion of a top wall 12 and is also bent at 13 to form a portion of the bottom wall 15. The plate 9 forms all of the rear camera wall 16 and forms a portion of the top wall 17 and a portion of the bottom wall 18.

Each of the plates 1 and 2 is preferably made of molded material or of die-cast material and each plate includes a bead 19 of uniform width extending completely around the outside edge of the wall. The bead is rectangular in shape as shown in Fig. 4 and it is adapted to fit into a channel-shaped forming 20 extending completely around the outer edges of the front plate 10 and a similar channel-shaped forming 21 extending completely around the side edges of the rear plate 9. Thus the channels 20 and 21 accurately position the main supporting side plates 1 and 2 in parallel relationship and at a fixed separation one from the other.

Each of the plates 1 and 2 is provided with a plurality of grooves for supporting the partition plates above described. The partition plate 3 which carries a suitable shutter designated broadly in Fig. 2 as 22 is a flat plate turned forwardly at 23 and rearwardly at 24, this plate fitting into the grooves 26, 27 and 28 in the side plates 1 and 2. The inwardly-formed flange 24 may be attached to a curved spool-holding partition plate 4 and this plate may fit into the grooves 29 and 30 of the side plates 1 and 2. Referring particularly to Fig. 2 it will be noticed that the groove 29 extends to a point 31 after which the groove is widened out at 32 and provided with a rounded end 33. The reason for this is as follows. The curved partition wall 4 receives a supply film spool S' and spring arms 34 are formed on the ends of the walls, and since it is desirable to have these spring arms press the spool against the fixedly held wall portions of plate 4, it is necessary to permit these arms to flex so as to permit a film spool to enter and, in addition, so as to permit the spring arms 34 to relieve pressure upon the spool, should the winding tension become too great. Thus the widened ends 32 and 33 of this groove permit movement of the spring arms 34 and at the same time limit movement of these arms to no greater than the necessary extent.

Each side plate 1 and 2 is provided with grooves 35 slanting from the center downwardly, grooves 36 at the lower edge of the grooves, and grooves 37 at the upper edges of the grooves, these grooves turning sharply and extending upwardly at 38 parallel to the camera front. These two sets of grooves receive the edges of the partition plate 5, the inner edge of which 39 forms one edge of an exposure frame. I prefer to emboss the plate 5 at 40 to increase its rigidity.

Each of the side plates 1 and 2 is provided with downwardly extending grooves 41 which engage the edges of the mirror carrying partition plate 6. These grooves extend downwardly at 42 near the center of the camera and upwardly and rearwardly at 43 and 44 to receive the upper forming 45 of the partition plate 6. The partition plate 6 may carry a suitable mirror 46 by means of clamps 46' overlying the two edges of the mirror. Movement of the mirror 46 after assembly is prevented by the flange 23 of the shutter partition plate 3 and by the forming 45 on the upper edge of the partition plate 6.

The upper spool chamber partition plate 7 is received by curved grooves 47 in each of the side plates 1 and 2, the curved ends 48 fitting over parallel ribs 49 formed on each of the side walls 1 and 2 and forming a portion of an exposure frame.

The exposure frame E is defined by the lower edge 50 of the partition plate 7, the rear edge 39 of the partition plate 5 and the two parallel ribs 49 formed directly on the side plates 1 and 2.

In assembling the camera the partition plates 3, 4, 5, 6 and 7 are all entered in their respective grooves in the two plates. This can be readily accomplished because the sole support for these plates are the grooves described above. The assembly of the front wall, that is the plate designated broadly as 10 which forms a portion of the top wall and a portion of the bottom wall, is then assembled by sliding the beads 19 of the two side plates into the grooves 20, these grooves accurately spacing the two side walls and holding them on at least a portion of two sides. However, I prefer to have each one of these wall sections 10 and 9 to engage all of one wall of the two side plates and portions of two other walls because by this construction the assembly of one plate, such as 10 on the camera, will hold the side walls with all of the partition walls in place. When so assembled a single bolt 51, as shown in Fig. 6, is passed through an aperture 52 in the one side plate 1, the opposite end passing into a nut 53 so that a threaded portion 54 of the bolt can be turned to fasten the side walls definitely in their fixed relationship defined by the channeled edges 20 of the outer wall section 10. Thus, a single bolt holds the camera together.

The wall section 10 includes a perforation or aperture 55 for supporting a lens 56 in a suitable lens cell 57. There is a second aperture 58 in which a lens 59 for the finder is mounted and in the top wall portion 12 there is an aperture 60 in which a viewing lens 61 is mounted. Lens 59 forms an image on the viewing lens 61 which is reflected by the mirror 46.

The front wall 10 and the portions of the top and bottom wall formed with it are a sub-assembly which consist of the inner wall member 10 with the channeled edges 20 on which are mounted a pair of decorative bands 63 and 64, as best shown in Fig. 5. These bands may be of formed metal or plastic and they are shaped to conform with the plate 10 and to fit snugly against the inner walls 65 of the channel members 20. The decorative bands 63 and 64 preferably include flanges 66 and 67 which are adapted to be engaged by the edges 68 and 69 of an outer plate member 70, best shown in Fig. 2.

The decorative bands 63 and 64 may be attached to the plate 10 by fasteners such as rivets 71, if desired, but these bands are primarily held in place by the outer plate 70 engaging the flanges as above described.

It should be noticed that the outer plate 70 is recessed at 70' over a portion of the front wall to receive a plate 72 which may be also a decorative plate and which may be fastened in place by rivets 73. This plate with the decorative plate forms a means for holding in the finder lens 59 and an upper flange 74 struck up from the plate 70 provides a means for clamping the flange 75 of the viewing lens 61 in place. Thus in assembling the front assembly the plate 10 is provided with the decorative strips 63 and 64, the finder lenses are laid in place, the outer plate 70 is slid into place overlying the flanges 66 and 67 of the decorative strips and overlying the periphery of the front lens 59 and the finder lens 61. Fasteners such as rivets 71 may then be used to hold these parts in place and at the same time fasten in an upper element 76 of a latch which cooperates with a second latch element 77 to hold the camera back section in place as will be later described. The construction of this material need not be fully described herein since it forms the subject matter of my application for "Camera latch," Serial No. 573,048, filed January 16, 1945 and now abandoned.

The wall section 9 is also a sub-assembly in that the latch member 77 may be attached as by rivet 78 after the wall section 9 has been provided with a newsboard filler piece 79 and an outer decorative covering piece 80 which may be of real or artificial leather. If desired, a foot 81 may be attached to the bottom wall section 18 so that the camera will stand erect on this foot and on a hinge loop 82 which may be carried by a hinge section 83 attached to the bottom wall section 18 as best indicated in Fig. 2. A hinge pintle 85 connects the hinge loop with a front hinge element 86 attached to the wall section 15 by rivets 87 which may also be used to attach the partition plates 3 and 4 together as indicated in Fig. 2.

It will thus be seen that by releasing the latch 76—77, as by moving a handle 88, the camera may be opened for loading thus exposing the entire camera back and exposure frame, an upper film chamber 89 and a lower film chamber 90. Film may be loaded in the camera by placing a fresh spool of film in the film chamber 90, causing the spring fingers 34 to spring outwardly so that the spool S' will be firmly held against the fixed wall 4 of the spool chamber. The film is then drawn over a roller 91, the trunnions 92 of which are carried by apertures in the side plates 1 and 2 and from this roller across the exposure frame E, which, as above pointed out, consists of the walls 49, 50, and 39. The film is then conducted to a take-up spool S and the end of the backing paper is attached to the hub H in the usual manner. The camera wall 9 is preferably provided with an aperture 93 which is covered with a filter window 94 through which the numerals on the film backing paper may be viewed.

A film winding knob 95 on the sidewall plate 1 is of the usual type including a one-way clutch so that this knob may be turned to advance film for threading and for each exposure.

The lens 56 is mounted in a suitable cell 57, this cell having a cylindrical portion 96 which passes through the aperture 55 in the front wall and this lens may be held in assembled relationship by means of the nut 97 having spring fingers 98 as shown in Fig. 3. By thrusting the cylindrical portion 96 through the aperture 99 in this nut, the fingers spring slightly outwardly and tightly engage the cylindrical portion to hold the lens in place. In addition, the lens includes a flange 57' which presses against and holds at least the central portion of the plate 72 tightly against the plate 70.

As indicated in Figs. 4, 5 and 7, the various grooves on the side plates 1 and 2 which hold the partition plates 3, 4, 5, 6 and 7 are all arranged so that the depth of the grooves is always sufficient to take the maximum width of the partition plates and they are also of sufficient depth to receive and hold a minimum width for these plates. The partition plates do not have to be extremely accurate in width because an entirely satisfactory assembly can be made with some plates slightly wider than others because the side supporting plates 1 and 2 do not in any way depend on the partition plates for their separation. The separation of these plates depends on the grooves 20 and 21 in the outer wall plates 9 and 10 and, since these grooves can readily be made both accurately and inexpensively, the accurate positioning of the sidewall plates 1 and 2 is assured and in assembling it is impossible to cause the partition plates to bind or bend because of the depth of the various grooves. This leads to extremely inexpensive assembly and, in addition, it permits the camera to be assembled by relatively unskilled help.

On the lens axis A and behind the objective 56 a shutter 22 is mounted on the shutter carrying partition plate 3. This plate has a perforation 100 which serves as a diaphragm and the shutter blade 101 is mounted on a pivot 102 and may be driven by means of a spring 103 engaging a stud 104 on the shutter blade and a second stud 105 carried by a cover plate 106. For further details of this preferred type of shutter to be used with my preesnt camera reference may be had to my copending application, Serial No. 622,026, filed October 12, 1945. This shutter is preferable for the present invention because it is relatively inexpensive but any suitable shutter may be used. The shutter is preferably assembled on the shutter partition plate 3 before this plate is attached to the front sub-assembly and to the wall plate 10. The shutter trigger is not shown in detail in this application but it comprises a plunger 110 preferably extending out into a cup-shaped forming 111 in the side wall plate 1. This cup-shaped recess prevents accidental operation of the trigger if the camera should be laid on its side.

While I have described a preferred form of camera body which can be constructed by assembling partition plates and subassemblies in a pair of grooved side plates and then holding the side plates in a fixed position by means of grooved wall plates receiving beads on the side plates, it is evident that various changes will readily suggest themselves and I consider within the scope of my invention all such forms as may come within the scope of the appended claims.

What I claim is:

1. In a camera body, the combination with a pair of spaced side walls having a plurality of edges and constituting partition supports, grooves in the walls, partition plates solely supported by the grooves of the side walls, said partitions including an angularly disposed mirror carrying plate, a shutter carrying plate, two film chamber forming plates, and a plate spaced from the mirror carrying plate and extending angularly from said mirror carrying plate and in an opposite direction thereto, all of said partition plates having opposite edges engaging and forming substantially light-tight connections with the grooves in the side walls, and an outside camera wall plate of rigid material having two bent portions and having spaced channeled edges extending throughout the lateral edges of the plate and bent therewith, each channeled edge closely fitting and engaging at least two of the edges of said spaced side plates to position said plates at a predetermined separation to retain the partition plates in the grooves of the side plates.

2. In a camera body, the combination with a pair of spaced side walls having a plurality of edges and constituting partition supports, grooves in the walls, partition plates solely supported by the grooves of the side walls, said partitions including an angularly disposed mirror carrying plate, a shutter carrying plate, two film chambers forming plates, and a plate spaced from the mirror carrying plate and extending angularly from said mirror carrying plate and in an opposite direction thereto, all of said partition plates having opposite edges engaging and forming substantially light-tight connections with the grooves in the side walls, and an outside camera wall plate of rigid material having two bent portions and having spaced channeled edges extending throughout the lateral edges of the plate and bent therewith, each channeled edge closely fitting and engaging at least two of the edges of said spaced side plates to position said plates at a predetermined separation to retain the partition plates in the grooves of the side plates, the channeled edges of the outside camera wall plate spacing the side plates a distance such that the opposite edges of the partition plates may incompletely fill the grooves in the side walls.

3. In a camera body, the combination with a pair of spaced side walls having a plurality of edges and constituting partition supports, grooves in the walls, partition plates solely supported by the grooves of the side walls said partitions including an angularly disposed mirror carrying plate, a shutter carrying plate, two film chamber forming plates, and a plate spaced from the mirror carrying plate and extending angularly from said mirror carrying plate and in an opposite direction thereto, all of said partition plates having opposite edges engaging and forming substantially light-tight connections with the grooves in the side walls, and an outside camera wall plate of rigid material, bent twice and having spaced channeled edges extending throughout the lateral edges of the plate and bent therewith, each channeled edge closely fitting and engaging at least two of the edges of said spaced side plates to position said plates at a predetermined separation to retain the partition plates in the grooves of the side plates, each side plate including a rib extending adjacent one edge and toward the opposite side plate to form together parallel edges defining two sides of an exposure frame, the other two sides of the exposure frame being defined by edges of two of said partition plates, one of said plates lying adjacent said mirror carrying plate and the other defined by an edge of said plate extending angularly from the mirror carrying plate and at an angle thereto, said exposure frame defining members all being located adjacent edges of the side plates constituting back edges thereof, and a lens axially positioned relative to the exposure frame.

4. In a camera body, the combination with a pair of spaced side walls having a plurality of edges and constituting partition supports, grooves in the walls, partition plates solely supported by the grooves of the side walls, said partitions including an angularly disposed mirror carrying plate, a shutter carrying plate, two film chamber forming plates, and a plate spaced from the mirror carrying plate and extending angularly from said mirror carrying plate and in an opposite direction thereto, all of said partition plates having opposite edges engaging and forming substantially light-tight connections with the grooves in the side walls, and an outside camera wall plate of rigid material bent twice and having spaced channeled edges extending throughout the opposite lateral edges of the plate and bent therewith, each channeled edge closely fitting and engaging at least two of the edges of said spaced side plates to position said plates at a predetermined separation to retain the partition plates in the grooves of the side plates, said outside channeled camera wall plate including an aperture, a pair of decorative strips carried by said wall plate, each including flanges extending toward each other and walls lying against an inside wall of said channel, a second wall plate having an aperture registering with the first-mentioned aperture, a lens positioned between the two apertured plates, and edges on the second wall plate and over the flanges on the decorative strips, and means to hold the first and second wall plates together thereby retaining the lens and decorative strips in position.

5. A camera body comprising a pair of side walls having edges of predetermined thickness and a plurality of grooves therein, two wall plates, one forming front and top walls, the other forming back and bottom walls, channels extending about the opposite edges of the two wall plates of a size to closely engage the edges of predetermined thickness of the side walls and hold said walls in a predetermined position, a plurality of partition plates each having opposite edges engaging and being supported by the grooves in the two side wall plates, one of said partition plates including a spring spool engaging member, said grooves supporting said spring member including widened areas permitting the spring spool engaging member to flex.

6. A camera body comprising a pair of side walls having edges of predetermined thickness and a plurality of grooves therein, two wall plates of rigid material, one forming front and top walls, the other forming back and bottom walls, channels extending about the opposite edges of the two wall plates of a size to closely engage the edges of predetermined thickness of the side walls and hold said walls in a predetermined position, a plurality of partition plates each having opposite edges engaging and being supported by the grooves in the two side wall plates, one of said partition plates including a spring spool engaging member, said grooves supporting said spring member including widened areas permitting the spring spool engaging member to flex, the spring spool engaging members being integral with a partition plate, the said groove including an area of a width to hold the partition plate adjacent the spring members in a fixed non-flexing position.

7. A camera body comprising a pair of spaced side walls having edges of predetermined thickness and having a plurality of grooves, the grooves in one wall facing the grooves in the other wall and being substantially right and left-hand and of similar pattern, two rigid plates both of U-shape when viewed from the side and both having one arm of the U materially longer than the other arm of the U, the entire lateral edges of both of the two plates including a channeled portion with the channels facing inwardly to engage the edges of predetermined thickness of the spaced side walls, and a plurality of plates, all of the same length, having their ends lying in and supported by the facing grooves in the side walls, thereby dividing the camera into a plurality of chambers, one of said two U-shaped plates supporting and positioning the side walls and partition plates, and the other of said two U-shaped plates being movably mounted with respect to the first-mentioned U-shaped plate to move relatively thereto to give access to the camera chambers for loading and unloading.

8. The camera defined in claim 7 characterized by the two U-shaped plates being hinged together transversely of the channels extending about their lateral edges, the long arm of one U-shaped plate being hingedly attached to the short arm of the other U-shaped plate, and means for latching the other arms of the two U-shaped plates together.

9. The camera defined in claim 7 characterized by the two U-shaped plates constituting the front and rear walls of the camera, one long arm and one short arm of each U-shaped plate forming the top camera wall, and one short arm and one long arm of each U-shaped plate forming the bottom wall of the camera.

10. The camera defined in claim 7 characterized by the two U-shaped plates being hinged together transversely of the channels extending about their lateral edges, one of the U-shaped plates forming the front wall, the long arm thereof forming part of the top wall, and the short arm thereof forming part of the bottom wall, the said U-shaped plate constituting, through its edge channels, a means for definitely positioning the spaced side walls and the plurality of partition plates solely positioned by the facing grooves of side walls.

11. The camera defined in claim 7 characterized by the two U-shaped plates being hinged together transversely of the channels extending about their lateral edges, the said first of the U-shaped plates forming the front wall, the long arm thereof forming part of the top wall, and the short arm thereof forming part of the bottom wall, the said U-shaped plate constituting, through its edge channels, a means for definitely positioning the spaced side walls and the plurality of partition plates solely positioned by the facing grooves of side walls, the said second of the U-shaped plates being mounted to move relative to said first U-shaped plate to engage and disengage the edge channels thereof with the side wall edges of predetermined thickness to open and close the camera.

12. A camera body comprising a pair of spaced side walls having edges of predetermined thickness and having a plurality of grooves, the grooves in one wall facing the grooves in the other wall and being substantially right and left-hand and of similar pattern, two rigid plates, one forming the entire front wall, most of the top wall and a small part of the bottom wall, the other forming the entire back wall, most of the bottom wall and a small part of the top wall, both of said plates including channels extending around their lateral edges of a width to snugly engage the edges of predetermined thickness of the side walls to hold the side walls at a fixed spacing, and a plurality of partition plates all of the same length to extend between and into the facing grooves in the spaced side walls, the ends of the plates and grooves being the sole support for the partition plates, and the plate forming the front wall, most of the top wall, and a small part of the bottom wall forming the sole means for holding the side plates with their partition plates between in a spaced position when the camera is opened by swinging the other rigid plate from the rigid plate forming the support of the side plates.

13. A sub-assembly for a camera comprising a rigid plate adapted to form walls of a camera, bent to lie in different planes, the plate having a flat surface forming a front camera wall, a surface lying in another plane forming a part of a top wall, and a surface lying in another plane forming part of a bottom wall, said plate including a channeled edge on each side extending throughout the edges of the surfaces lying in different planes, said channeled edges having flanges with certain walls thereof lying opposite each other, bands having areas lying in different planes fitting and lying against the channel walls lying opposite each other, said bands being decorative, said band also including flanges, and a second plate bent twice into different planes to fit the first-mentioned rigid plate and overlying the flanges of the bands to hold the latter on the rigid plate, and means for holding the second plate on the said rigid plate.

14. The sub-assembly for cameras defined in claim 13 characterized by the rigid plate, the bands and the second plate all being substantially U-shaped in cross section.

MILLER R. HUTCHISON, Jr.

REFERENCES CITED

The following references are of record in the file of this patent:

UNITED STATES PATENTS

| Number | Name | Date |
| --- | --- | --- |
| 397,428 | Higgins | Feb. 5, 1889 |
| 594,368 | Ames et al. | Nov. 30, 1897 |
| 661,469 | Eastman | Nov. 6, 1900 |
| 725,034 | Brownell | Apr. 14, 1903 |
| 925,675 | Babst | June 22, 1909 |
| 1,454,198 | Warren | May 8, 1923 |
| 1,811,823 | Horton | June 23, 1931 |
| 1,952,224 | Trautmann et al. | Mar. 27, 1934 |
| 2,018,670 | Herman | Oct. 29, 1935 |
| 2,059,827 | Teague | Nov. 3, 1936 |
| 2,086,315 | Faas | July 6, 1937 |
| 2,104,094 | Nerwin | Jan. 4, 1938 |
| 2,208,797 | Kende | July 23, 1940 |
| 2,292,218 | Drotning et al. | Aug. 4, 1942 |
| 2,324,086 | Hutchison, Jr. | July 13, 1943 |
| 2,367,504 | Hutchison, Jr. | Jan. 16, 1945 |

FOREIGN PATENTS

| Number | Country | Date |
| --- | --- | --- |
| 662,100 | Germany | July 5, 1938 |